UNITED STATES PATENT OFFICE.

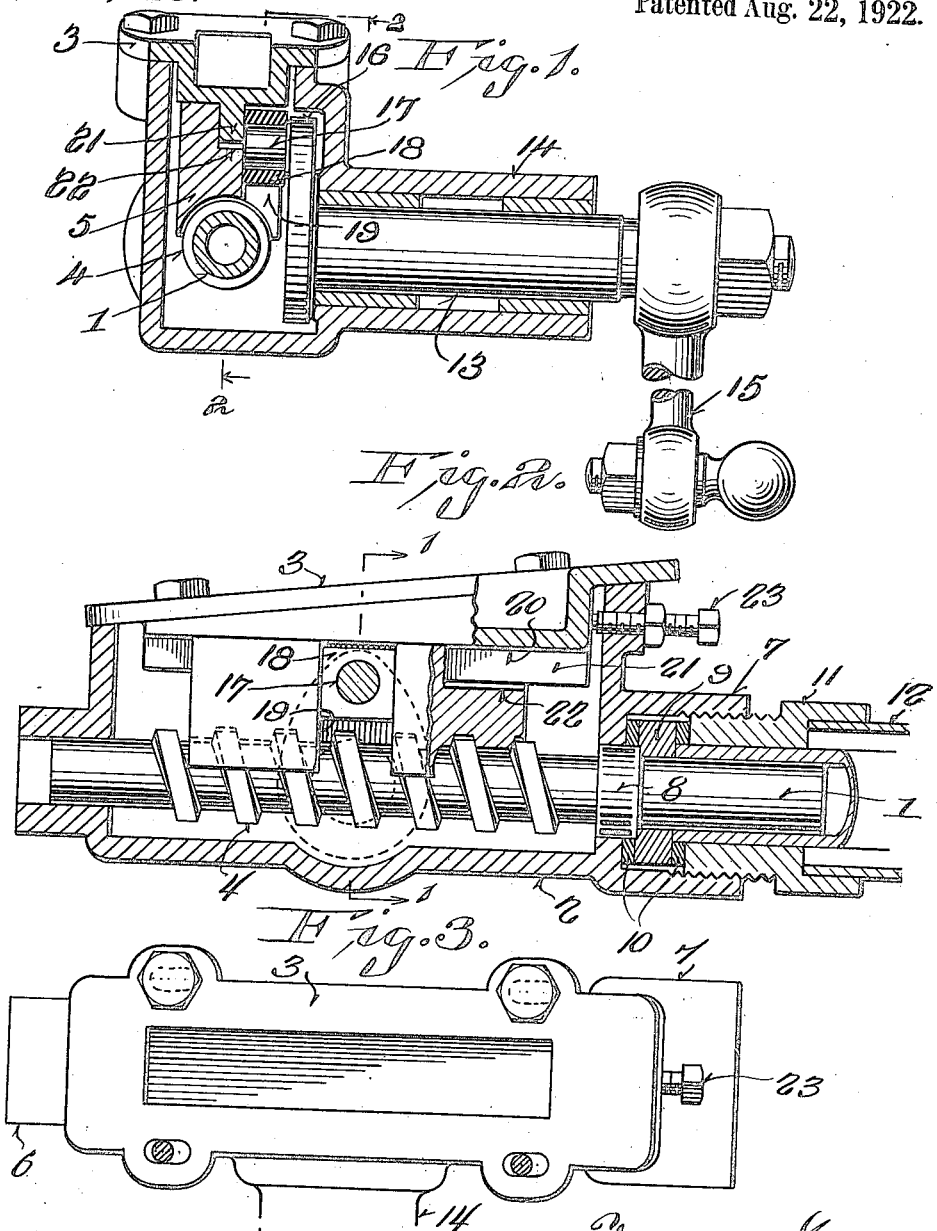

ERNST SCHMALLER, OF RACINE, WISCONSIN, ASSIGNOR TO PAUL B. WOHLRAB, OF RACINE, WISCONSIN.

STEERING-POST TRANSMISSION MECHANISM.

1,426,915.     Specification of Letters Patent.    Patented Aug. 22, 1922.

Application filed December 12, 1921. Serial No. 521,765.

*To all whom it may concern:*

Be it known that I, ERNST SCHMALLER, a citizen of the United States, and resident of Racine, in the county of Racine and State of Wisconsin, have invented certain new and useful Improvements in Steering-Post Transmission Mechanism; and I do hereby declare that the following is a full, clear, and exact description thereof.

My invention pertains to improvements in steering post transmission mechanism for automobiles or other types of vehicles and is more particularly directed to that type of transmission employing a screw threaded steering post and slidable block actuated thereby.

The primary object of the present invention resides in the provision of means for obtaining adjustment between the block and steering post to compensate for wear.

A further object resides in the provision of a housing adapted to be secured to the frame of a vehicle within the restricted space between the frame and engine, and to which access may be had through the top, thereby permitting removal of certain parts without necessitating dismantling of the entire mechanism from the vehicle.

With the foregoing and other objects in view the invention resides in the novel combination and arrangement of parts which will be hereafter more particularly described and claimed.

In the drawings:—

Figure 1 is a vertical transverse section taken on the line 1—1 of Figure 2.

Figure 2 is a central longitudinal section through the housing in which the movable parts of the device are disposed, said section being indicated by the line 2—2 of Figure 1.

Figure 3 is an elevational plan view of the invention.

Referring now more particularly to the accompanying drawings wherein similar reference characters indicate like parts, the numeral 1 designates a steering post having its lower end enclosed within the housing 2, which housing is opened at the top and provided with an inclined cover plate 3 forming a closure therefor. The plate 3 is removable so that access may be obtained to the interior of the housing. That portion of the steering post 1 disposed within the housing 2 is provided with the screw threads 4 adapted to mesh with similar threads formed in the longitudinal channel of the block 5, the latter being disposed within the casing and partially surrounding the steering post. This arrangement permits the block 5 to slide longitudinally, upon rotation of the steering post in either direction.

The casing 2 may be secured in any suitable manner to the frame of the vehicle on which it is mounted and is provided at its opposite ends with the bearings 6 and 7 in which the steering post is journalled. In order to permit removal of the steering post the bearing 7 has an opening, considerably larger than the bearing 6, to allow the screw threads 4 to be removed therethrough. The steering post 1 is provided with an enlarged bearing portion 8 adapted to cooperate with the bearing 7, while surrounding the post and secured thereto in any suitable manner, is a collar 9 which works against a pair of washers 10 for the purpose of taking end thrust of the steering post. In order to prevent longitudinal movement of the post within the housing, a nut 11 is threaded into the end of the bearing 7 which nut is provided with a recess adapted to receive and support the steering post casing 12. The longitudinal movement of the block 5 is utilized to operate a rock shaft 13 journalled in the bearing 14 projecting from the side of the housing, the outer end of said shaft having mounted thereon a depending arm 15 which arm is connected to an additional part of the steering mechanism not shown. The inner end of the rock shaft 13 is provided with an arm 16 from which projects a stud 17 for disposition in a bearing block 18, the latter being positioned in a vertical slot 19 formed centrally in the block 5. The bearing block 22 is substantially rectangular and the slot in which it is disposed is approximately of the same width. It is obvious that when the steering post 1 is rotated movement will be transmitted to the block 5 and in turn to the rock shaft 13 which will oscillate the arm 15 in the proper direction for guiding the vehicle.

For the purpose of guiding the block 5 the cover 3 which is inclined on an angle to the axis of the steering post, is provided with a bearing surface 20 parallel to the axis of the steering post, which engages and holds the block 5 into engagement with the steering post. To prevent lateral movement of the block 5 a depending tongue 21 projects into the groove 22 formed longitudinally in the block 5.

From the foregoing it is obvious that the cover 3 with its depending guide forms a wedge which upon adjustment in one direction will urge the block 5 into engagement with the steering post and thereby compensate for any wear between these two members. This adjustment is procured through the slotted connection of the cover with the housing and the set screw 23.

I claim:—

1. A steering gear transmission mechanism comprising a steering post, a block slidable on said post, a casing surrounding said post and block, said casing being open at its top, and a cover for said opening, said cover serving as a guide for the block and being longitudinally adjustable with relation to the casing on an angle to the axis of the steering post, whereby adjustment between the block and post is obtained.

2. A steering gear transmission mechanism comprising a steering post, a block slidable on said post, a casing surrounding said post and block, said casing having an inclined opening at one side and a cover for said opening, said cover serving as a combined wedge and guide, whereby the block is urged into engagement with the steering post.

In testimony that I claim the foregoing I have hereunto set my hand at Racine, in the county of Racine and State of Wisconsin.

ERNST SCHMALLER.